Patented Dec. 17, 1940

2,225,162

UNITED STATES PATENT OFFICE 2,225,162

VITRIFIABLE ENAMEL

Alden J. Deyrup, Elizabeth, N. J., assignor to E. I. du Pont de Nemours & Company, Wilmington, Del., a corporation of Delaware No Drawing. Application February 28, 1938, Serial No. 192,965. Renewed September 13, 1939

14 Claims. (Cl. 106—36.2)

This invention relates to the decoration of surfaces of ceramic articles by use of low melting vitrifiable enamels. More particularly the invention relates to the application of low melting vitrifiable enamels, usually pigmented or opacified, to the surfaces of glass objects for decorative purposes.

My co-pending applications S. N. 131,528 and S. N. 132,660, filed March 17, 1937 and March 23, 1937, respectively, describe general methods for preparing and using vitrifiable enamels for application to glass, which enamels are characterized by a high resistance to chemical attack. My present invention is, in part, an improvement on and an addition to the discoveries of my above co-pending applications and is concerned principally with vitrifiable enamels having a remarkable resistance to attack by sulfur-containing materials.

Vitrifiable enamels known heretofore which are fusible at temperatures low enough to permit their practical use on glass are notably lacking in resistance to chemical attack. Previous improvements in the art of making vitrifiable enamels, as described in my above co-pending applications and also in my co-pending applications S. N. 65,935; 131,529 and 141,188, filed February 26, 1936; March 17, 1937; and May 6, 1937, respectively, have resulted in greatly improving the stability of such enamels toward attack by acids, alkalies and cleaning agents. However, the problem of making low melting enamels which are resistant also to attack by sulfur-containing materials has thus far resisted every effort at solution.

The lack of resistance to staining by sulfur-containing materials has constituted a serious hindrance to the full and effective commercial utilization of vitrifiable enamels on glass. As an outstanding example of this, in the field of glass tableware, attempts have been made heretofore to use vitrifiable enamels to produce brilliant and varicolored decorations on such ware, which attempts failed because of the fact that the enamels used were stained brown or gray by contact with food materials containing sulfur and thus lost their original attractive appearance, becoming undesirable in the eyes of the users. Numerous efforts have been made to discover low melting vitrifiable enamels suitably resistant to the attack of sulfur-containing food materials. However, to my knowledge, all of these efforts have resulted in failure and no one has succeeded prior to the present invention in solving this problem in a satisfactory manner.

It is known in the arts of ceramics and vitrifiable enamels that in general the resistance of such an enamel to any form of chemical attack may be increased by altering the composition so as to increase its melting point. It is also generally known that, conversely, any alteration in the composition which tends to lower the fusion point of the enamel will also tend to reduce its chemical resistance. This is a general rule, but I find that it is not universally valid. My discoveries constitute specific exceptions to this rule. In view of this generally accepted relationship between the fusion temperature of a vitrifiable enamel and its chemical resistance, it has generally been the practice to employ relatively high melting enamels when a high degree of resistance is desired. In the decoration of glassware, however, the extent to which the resistance of the vitrifiable enamel may be increased by this method is limited in that if the melting point of the enamel is increased beyond the deformation temperature of the glass, which is generally around 600° C., the enamel will not mature properly on the glass and is therefore of little utility. Ordinarily the chemical resistance of enamels known heretofore which have a fusion temperature approximately that of the deformation point for glass is not adequate and, in the case of resistance toward attack by sulfur-bearing compounds, such enamels are of little practical value. On the other hand, the more fusible enamels, e. g., the usual lead silicate and lead borosilicate enamels, which can be readily applied to glassware are of little or no practical value since they possess little resistance to chemical attack. By the exercise of my present invention, however, it is possible to prepare vitrifiable enamels which will mature to a glossy smooth surface at temperatures below the range at which glass objects deform, and yet possess excellent resistance to attack by food or other materials or gases containing sulfur or its compounds.

Accordingly, it is an object of my invention to prepare low melting lead silicate and lead borosilicate vitrifiable enamels which are highly resistant especially to attack by sulfur-bearing materials. A further object is to produce low melting vitrifiable enamels consisting principally of silica, lead oxide, titanium dioxide and lithium oxide, which may or may not contain boric oxide, which enamels mature to an excellent glossy surface at practical glass decorating temperatures and, in addition to having a high resistance to acids and alkalies, are especially resistant to attack by sulfur-containing substances. A still further object is the provision of improved low melting vitrifiable enamels which may be applied for decorative purposes on glass intended for use in contact with foods and are highly resistant to staining and attack by sulfur-bearing food materials, e. g., eggs. These and other objects will be apparent from the ensuing description of my invention.

I have discovered that if the oxides of lithium and titanium are used together as ingredients of a lead silicate or lead borosilicate flux, enamels may be obtained from such a flux which mature to an excellent glossy surface at practical glass decorating temperatures, which enamels have good resistance to acids and alkalies and at the same time are virtually proof against staining by contact with sulfur-bearing materials. This surprising result has not been observed in any other enamel composition for glass and appears to be unique for those compositions in which the oxides of lithium and titanium are both present.

The alkali metal oxides are generally regarded in the ceramic and glass arts as being substantially the equivalent of each other since the general experience heretofore in the use of these oxides has been that no sharp change in the properties is brought about by the substitution of one alkali metal oxide for another. However, I have now discovered that the alkali metal oxides, when used in low melting vitrifiable enamel compositions containing titanium, are not the equivalent of each other in their effect upon sulfide resistance. Thus, while the use of lithium oxide in combination with titanium oxide produces an enamel which is virtually proof against staining by sulfide-bearing materials, other alkali metal oxides, e. g., sodium oxide and potassium oxide, do not exert this effect when used in combination with titanium oxide. This discovery is indeed surprising and is clearly unexpected in view of the generally accepted belief that all alkali metal oxides are approximately equal in their effect in compositions of the present type.

In practicing my invention it is essential that the oxides of lithium and titanium be used together as ingredients of the flux in order that the enamels resulting therefrom may possess the sulfide resistance characteristic of my improved vitrifiable enamels. Other alkali metal oxides may be used, however, in addition to the oxide of lithium, but the effect of such other oxide is no more than that which would be generally expected in view of the previously known effect of such oxides in such compositions. It is not known why the joint use of lithium and titanium oxides should have the effect which I have discovered but I have found that this effect is obtained only through their simultaneous presence in the composition and not through the use of either substance separately.

Both lithium and titanium oxides have been previously used as ingredients of enamel compositions. Generally, the titanium oxide, which is commonly regarded in the art as being a refractory oxide, has been used as a milled-in ingredient and is not melted into the flux. So far as I am aware, no one has ever before used the combination of these oxides as melted-in ingredients of the flux from which the present improved enamels may be obtained. Furthermore, I have found no reference in published literature which would suggest the use of these oxides either singly or in combination as a means of imparting sulfide-resistance to a vitrifiable enamel composition. Sulfide resistance is a highly specific property and is probably related to a large extent to the amount of lead and other heavy metals in the composition and to the chemical combinations of these metals in the finished enamel. My vitrifiable compositions, which are also excellently resistant to acids and alkalies, are not readily attacked or stained by sulfur-bearing materials even under severe exposure conditions. It is therefore evident that my invention constitutes a notable improvement over previous advances in this field, such as those described in my above mentioned co-pending applications.

As examples of batch compositions for low melting lead silicate and lead borosilicate fluxes of superior resistance to sulfur-bearing materials, containing titanium oxide and lithium oxide, melted in as ingredients of the flux, the following typical batches are given:

*Batch A*

| | Per cent |
|---|---|
| Red lead | 55.1 |
| Flint | 35.1 |
| Titanium dioxide | 2.8 |
| Lithium carbonate | 7.0 |

*Batch B*

| | Per cent |
|---|---|
| Red lead | 52.3 |
| Flint | 36.9 |
| Titanium dioxide | 4.3 |
| Lithium carbonate | 3.2 |
| Soda ash | 3.3 |

*Batch C*

| | Per cent |
|---|---|
| Red lead | 31.4 |
| Flint | 16.0 |
| Titanium dioxide | 4.1 |
| Lithium carbonate | 5.9 |
| Cadmium carbonate | 3.0 |
| *Sodium silicate | 33.1 |
| Boric acid | 6.5 |

*Batch D*

| | Per cent |
|---|---|
| Red lead | 50.5 |
| Flint | 19.0 |
| Titanium dioxide | 2.4 |
| Lithium carbonate | 4.3 |
| *Sodium silicate | 19.9 |
| Alumina hydrate | 3.9 |

* Sodium silicate: 23.5% $Na_2O$, 76.5% $SiO_2$

After melting, the fluxes or molten glassy materials resulting from the foregoing batch compositions will have the following calculated compositions:

*Calculated Compositions*

A

| | Per cent |
|---|---|
| PbO | 57.0 |
| $SiO_2$ | 37.1 |
| $TiO_2$ | 3.0 |
| $Li_2O$ | 2.9 |

B

| | Per cent |
|---|---|
| PbO | 53.6 |
| $SiO_2$ | 38.6 |
| $TiO_2$ | 4.5 |
| $Li_2O$ | 1.3 |
| $Na_2O$ | 2.0 |

C

| | Per cent |
|---|---|
| PbO | 33.3 |
| SiO$_2$ | 44.8 |
| TiO$_2$ | 4.4 |
| Li$_2$O | 2.5 |
| CdO | 2.4 |
| Na$_2$O | 8.5 |
| B$_2$O$_3$ | 4.1 |

D

| | Per cent |
|---|---|
| PbO | 52.2 |
| SiO$_2$ | 36.0 |
| TiO$_2$ | 2.5 |
| Li$_2$O | 1.8 |
| Na$_2$O | 4.9 |
| Al$_2$O$_3$ | 2.6 |

The ranges in which the calculated contents of the principal ingredients of the improved fluxes of my invention will lie are given in the following table:

Ranges for Principal Flux Components

| | Per cent |
|---|---|
| PbO | 30–60 |
| SiO$_2$ | 30–50 |
| TiO$_2$ | 1–6 |
| Li$_2$O | 1–4 |
| B$_2$O$_3$ | 0–10 |

All of these percentages are by weight and are based upon the total weight of the melted flux.

The above table of principal flux components will be of assistance if it is desired to depart from the specific examples given above which are to be understood as being illustrative and not restrictive. It will be understood that in the application of this table, optimum resistance to sulfur-bearing materials will be obtained by adjusting the proportions of refractory oxides, e. g., silica, or by adding other refractory oxides, such as alumina, in amounts such that the melting point of the resulting flux is no lower than necessary to secure a glossy surface when the glass-enamel made therefrom is applied to glass objects and fired under commercial decorating conditions. This statement is based upon my experience with these novel fluxes as well as upon the generally recognized rule stated above regarding the inverse relationship between the fusion temperature and chemical resistance.

In departing from the specific examples given above, I have discovered that an increase of the total alkalies is beneficial to sulfide-resistance as the lead oxide content is diminished simultaneously so as to maintain the fusion temperature unchanged. However, if too much alkali is present the enamel may crack or craze on the glass. It is generally beneficial from an economic standpoint and frequently not detrimental to the glass enamel-properties to include other alkali metal oxides, e. g., sodium oxide, in addition to lithium oxide in my flux compositions containing titanium oxide. Of the alkali metal oxides, I prefer to employ a mixture of equimolecular weights of lithium and sodium oxide over any other mixture of lithium and sodium and/or potassium oxides. An excess of titanium oxide should be avoided because, when an excess is employed, it may separate out at high application temperatures, causing a variable yellow opacity and devitrification. I usually prefer to use little and sometimes no boric oxide in my improved flux compositions because its presence is detrimental to the acid resistance produced by titanium oxide as described in my co-pending application, S. N. 132,660, filed March 23, 1937.

The present fluxes may be prepared by the usual processing methods employed with other glass-enamel fluxes since the merit of these fluxes depends essentially upon the chemical composition rather than on particular details of processing. The materials comprising the batch may be mixed together and melted by the application of heat in a refractory crucible. After frothing ceases and proofs taken from the melt with an iron rod are clear and transparent, indicating that the titanium oxide and the refractory materials have dissolved in the melt, the flux is poured into water and thereby fritted. The coarsely fritted flux obtained may then be ground together with ceramic pigments in the usual proportions and manner to make vitrifiable enamels which are then ready to be applied to glass surfaces. In the mode of handling, application and the temperature and method of melting, my new compositions containing both titanium and lithium oxide are similar to the ordinary lead borosilicate compositions. My new products differ sharply from such old compositions only in their greater superiority to resistance to attack by sulfur-bearing materials and to other chemical attack which property renders them useful in broad new fields.

In order to demonstrate the superior resistance of my improved low melting enamels, various articles were coated with enamels prepared from the batch compositions designated above as A, B and C. These vitrifiable enamels, after application and firing on the objects to be decorated, were subjected to tests to determine their resistance to chemical attack, the nature of these tests being specified in the following examples:

Example I

A yellow enamel composition was prepared from the flux of Batch A as given above by grinding therewith 4% by weight of yellow lead antimonate ceramic pigment. Glass saucers were coated with this yellow enamel and fried eggs were placed and allowed to remain thereon for one hour. For comparison purposes glass saucers were coated with similar yellow enamels prepared from the ordinary lead borosilicate fluxes and with other yellow enamels prepared from the fluxes described in my co-pending applications S. N. 65,935; 131,528; 132,660 and 141,188 mentioned above, and these decorated saucers were then subjected to the same test. At the end of one hour the ordinary lead borosilicate enamels were blackened in large blotches and the enamels prepared according to my co-pending applications developed gray-brown blotches. These stains could not be removed entirely with soap and water. The improved enamels containing titanium dioxide and lithium oxide, however, were practically unaffected and were found to be entirely free from any stain or blemish after the eggs were washed off.

The compositions of the enamels described in my co-pending applications and employed for comparison purposes in the tests described in Example I above and in Example II below are now given in order that the importance of the results of these tests may be fully appreciated. The enamels of application S. N. 65,925 contained as melted components lead oxide, silica, bismuth oxide and sodium oxide; those of S. N. 131,528 contained lead oxide, silica, boric oxide and melted-in titanium dioxide; and the enamels of S. N.

132,660 contained lead oxide, silica, melted-in titanium dioxide and sodium oxide. These enamels possess a high resistance, especially to attack by acids and alkalies. The enamels of S. N. 141,188 were of the lead borosilicate type and contained melted-in zirconium dioxide which imparted to the flux exceptional resistance to attack by alkalies.

Hot fried eggs have been found to be the most severe reagents for determining the resistance of an enamel to sulfur-bearing materials. In some cases enamels of the older types may withstand contact with eggs in other forms but invariably they are blemished or blackened by contact with hot fried eggs. In view of the severity of the test described in Example I, it is apparent that the results obtained demonstrate the remarkable superiority of my new enamels as regards resistance to sulfur-bearing materials.

*Example II*

Pieces of glass coated with the respective enamels in Example I were moistened and exposed to an atmosphere of hydrogen sulfide gas. The enamels made with the usual lead borosilicate fluxes became black or dark brown immediately upon contact with the hydrogen sulfide atmosphere. Those prepared according to my copending applications S. N. 65,935; 131,528; 132,660 and 141,188 remained unchanged at first but showed a noticeable darkening at the end of one hour. In contrast, the present improved enamels containing both titanium and lithium oxides showed no darkening over periods of exposure as long as 16 hours.

A wide variety of chemical compounds may be selected to secure the elements indicated in the calculated flux compositions set forth above. The necessary lead oxide may be obtained either from white lead, litharge, red lead, lead nitrate or similar compounds. If desired, two or more lead compounds in any desired proportion may be utilized as a source of the lead oxide. The silica may be secured from sand, flint, or other convenient source. The source of lithium oxide may be any compound which will yield lithium oxide when melted together with the other ingredients of the composition. Examples of such compounds are lithium hydroxide, nitrate and carbonate. Titanium oxide of the usual pigment grade is entirely suitable for use in my compositions. Also, other titanium compounds, e. g., lead titanate, may be used as the source of the titanium dioxide.

No definite conditions of temperature and time need be maintained in carrying out the melting of the components to produce my improved fluxes. It is only necessary to bring the batch mixture to its melting point and hold it there for a sufficient period of time so that the components react and form a molten glass which is reasonably free of unreacted or undissolved materials. The molten flux is usually poured into water in the fritting operation. It may also be poured out upon any convenient clean surface if desired. After pouring, the flux is crushed and ground or otherwise comminuted as desired in accordance with any suitable procedure.

Any of the known ceramic pigments may be introduced into my improved fluxes by milling or grinding. Examples of suitable pigments or opacifiers are lead molybdate, zirconium oxide or titanium oxide. Other pigments which may be ground in with the flux are cobalt aluminate blue, lead antimonate yellow, and the like. It may be preferred in some cases to pigment the flux by melting in a coloring compound directly with the batch. Such compounds may be cobalt oxide, lead chromate, or the like. The exact proportion of pigment to be incorporated depends chiefly upon the color desired and the nature of the pigment. Generally the proportion will lie within the range of 2 to 15% of pigment based upon the total weight of the flux.

In the appended claims, the term "lead silicate," or vitrifiable enamels of the lead silicate type, is used to define my improved enamels which contain lead oxide and silica together with melted-in titanium dioxide and lithium oxide. The term "lead borosilicate," or vitrifiable enamels of the lead borosilicate type, is used to define my improved enamels which contain lead oxide, silica and boric oxide together with melted-in titanium dioxide and lithium oxide. These enamels may or may not contain alkali metal oxides in addition to lithium oxide.

The above description and examples of my invention are intended to be illustrative and not restrictive. Various modifications thereof and variations therefrom which conform to the spirit of my invention are intended to be included within the scope of the appended claims.

I claim:

1. A sulfide-resistant, low-melting, vitrifiable enamel suitable for decorating glassware containing as melted-in ingredients thereof, titanium dioxide and lithium oxide.

2. A sulfide-resistant, low-melting, vitrifiable enamel suitable for decorating glassware selected from the group consisting of silicates of lead and borosilicates of lead, said enamel containing as melted-in ingredients thereof, titanium dioxide and lithium oxide.

3. A sulfide-resistant, low-melting, lead silicate vitrifiable enamel suitable for decorating glassware containing as ingredients thereof, melted-in titanium dioxide and lithium oxide.

4. A sulfide-resistant, low-melting, lead borosilicate vitrifiable enamel suitable for decorating glassware containing as ingredients thereof, melted-in titanium dioxide and lithium oxide.

5. A sulfide-resistant, low-melting vitrifiable enamel suitable for decorating glassware comprising lead oxide, silica, melted-in titanium dioxide and lithium oxide.

6. A sulfide-resistant, low-melting vitrifiable enamel suitable for decorating glassware comprising lead oxide, silica, boric oxide, melted-in titanium dioxide and lithium oxide.

7. A sulfide-resistant, low-melting vitrifiable enamel suitable for decorating glassware selected from the group consisting of silicates of lead and borosilicates of lead, said enamel containing 1–6% by weight of titanium dioxide and 1–4% by weight of lithium oxide, said oxides of titanium and lithium being melted into said vitrifiable enamel composition.

8. A sulfide-resistant, low-melting, vitrifiable enamel suitable for decorating glassware comprising 30–60% of lead oxide, 30–50% of silica, 1–6% of titanium dioxide and 1–4% of lithium oxide, said amounts being by weight based upon the total weight of the enamel, and said oxides being melted into said vitrifiable enamel composition.

9. A sulfide-resistant, low-melting, vitrifiable enamel suitable for decorating glassware comprising 30–60% of lead oxide, 30–50% of silica, boric oxide in an amount not exceeding 10%, 1–6% of titanium dioxide and 1–4% of lithium oxide, said amounts being by weight based upon the total weight of the enamel, and said oxides being melted into said vitrifiable enamel composition.

10. A sulfide-resistant, low-melting, vitrifiable enamel suitable for decorating glassware selected from the group consisting of silicates of lead and borosilicates of lead, said enamel containing 1–6% by weight of titanium dioxide, 1–4% by weight of lithium oxide, said oxides being melted into said vitrifiable enamel composition, and a ceramic pigment.

11. A sulfide-resistant, low-melting, vitrifiable enamel suitable for decorating glassware obtainable by melting together lead oxide, silica, titanium dioxide and lithium oxide.

12. A sulfide-resistant, low-melting, vitrifiable enamel suitable for decorating glassware obtainable by melting together lead oxide, silica, boric oxide, titanium dioxide and lithium oxide.

13. A process for preparing sulfide-resistant, low-melting vitrifiable enamels suitable for decorating glassware comprising melting a composition comprising ingredients yielding in the molten state lead oxide, silica, titanium oxide and lithium oxide.

14. A process for preparing sulfide-resistant, low-melting vitrifiable enamels suitable for decorating glassware comprising melting a composition comprising ingredients yielding in the molten state lead oxide, silica, boric oxide, titanium oxide and lithium oxide.

ALDEN J. DEYRUP.